United States Patent [19]
Wright et al.

[11] Patent Number: 6,108,523
[45] Date of Patent: Aug. 22, 2000

[54] WIRELESS, FREQUENCY-AGILE SPREAD SPECTRUM GROUND LIKE-BASED AIRCRAFT DATA COMMUNICATION SYSTEM WITH REMOTE FLIGHT OPERATIONS CONTROL CENTER

[75] Inventors: Thomas H. Wright, Indialantic; James J. Ziarno, Malabar, both of Fla.

[73] Assignee: Harris Corporation, Melbourne, Fla.

[21] Appl. No.: 09/251,667

[22] Filed: Feb. 17, 1999

Related U.S. Application Data

[63] Continuation of application No. 08/557,269, Nov. 14, 1995, Pat. No. 6,047,165.

[51] Int. Cl.$^7$ .............................. H04B 7/00; G08B 21/00
[52] U.S. Cl. ........................... 455/66; 455/431; 701/14; 701/35; 340/945; 375/200; 375/219
[58] Field of Search .......................... 455/66, 67.1, 54.1, 455/33.1, 431; 340/945, 963, 825.72, 825.69, 961, 971; 701/14, 29, 35; 375/200, 219, 220

[56] References Cited

U.S. PATENT DOCUMENTS

| | | |
|---|---|---|
| 4,642,775 | 2/1987 | Cline et al. .............................. 701/200 |
| 4,729,102 | 3/1988 | Miller, Jr. et al. ........................ 701/14 |
| 4,872,182 | 10/1989 | McRae et al. ............................ 375/200 |
| 5,022,024 | 6/1991 | Paneth et al. ............................ 370/334 |
| 5,339,330 | 8/1994 | Mallinckrodt ............................ 370/320 |
| 5,359,446 | 10/1994 | Johnson et al. .......................... 359/152 |
| 5,459,469 | 10/1995 | Schuchman et al. ...................... 342/37 |
| 5,463,656 | 10/1995 | Polivka et al. ........................... 375/200 |

FOREIGN PATENT DOCUMENTS

| | | |
|---|---|---|
| 0 407 179 A1 | 7/1990 | European Pat. Off. . |
| 2 276 066 | 9/1994 | United Kingdom . |

*Primary Examiner*—Donnie L. Crosland
*Attorney, Agent, or Firm*—Allen, Dyer, Doppelt, Milbrath & Gilchrist, P.A.

[57] ABSTRACT

A flight information communication system has a plurality of RF direct sequence spread spectrum ground data links that link respective aircraft-resident subsystems, in each of which a copy of its flight performance data is stored, with airport-located subsystems. The airport-located subsystems are coupled by way communication paths, such as land line telephone links, to a remote flight operations control center. At the flight operations control center, flight performance data downlinked from plural aircraft parked at different airports is analyzed. In addition, the flight control center may be employed to direct the uploading of in-flight data files, such as audio, video and navigation files from the airport-located subsystems to the aircraft.

38 Claims, 8 Drawing Sheets

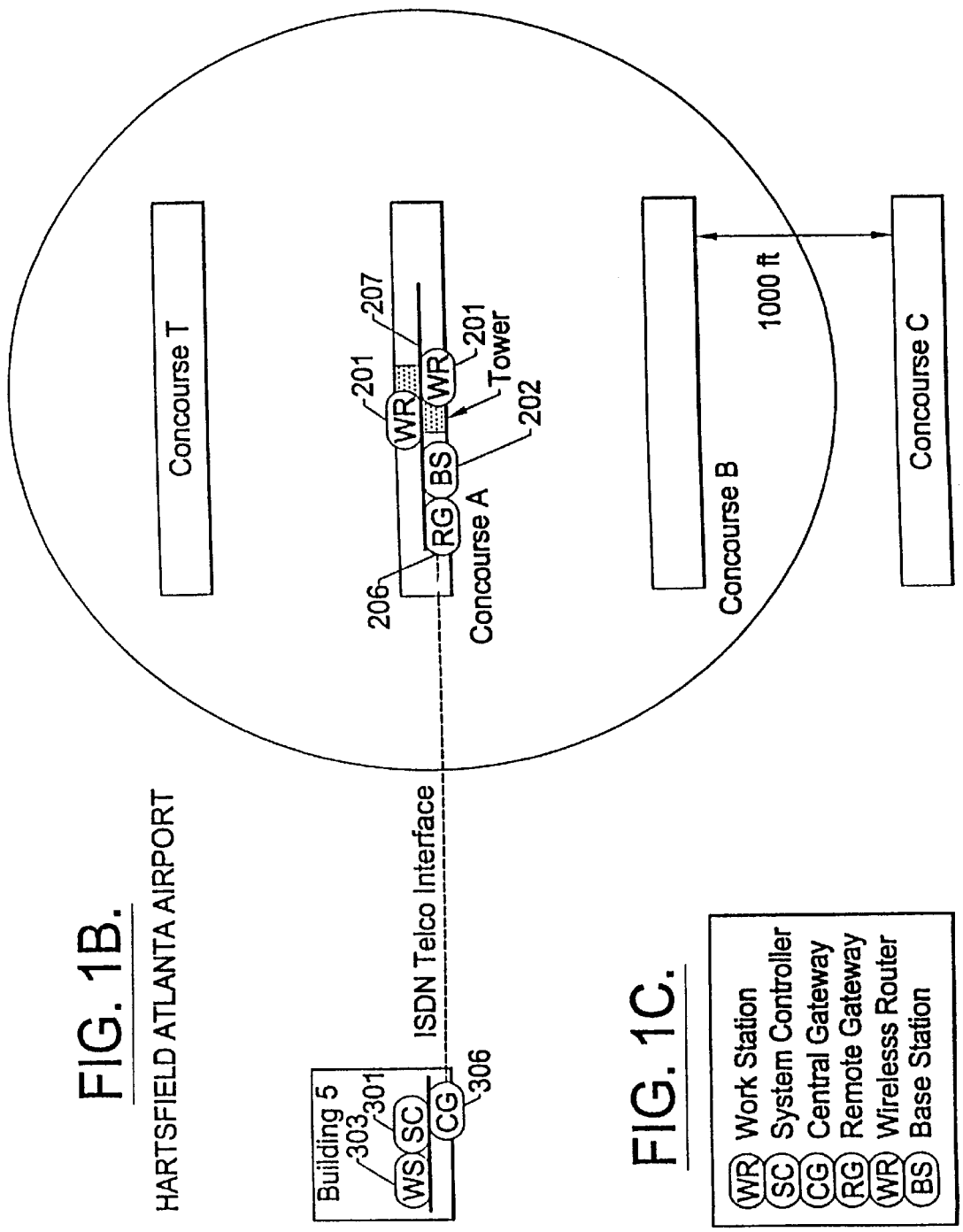

6,108,523

WIRELESS, FREQUENCY-AGILE SPREAD SPECTRUM GROUND LIKE-BASED AIRCRAFT DATA COMMUNICATION SYSTEM WITH REMOTE FLIGHT OPERATIONS CONTROL CENTER

This application is a continuation of Ser. No. 08/557,269 filed on Nov. 14, 1995, now U.S. Pat. No. 6,047,165.

FIELD OF THE INVENTION

The present invention relates in general to communication systems, and is particularly directed to an aircraft data communication system having a plurality of wireless ground links that link respective aircraft-resident subsystems, in each of which a copy of its flight performance data is stored, with airport-located ground subsystems, each ground subsystem being coupled, in turn, by way of respective telco links to a remote flight operations control center, where flight performance data from plural aircraft parked at different airports may be analyzed and from which the uploading of in-flight data files may be directed by airline systems personnel.

BACKGROUND OF THE INVENTION

Modern aircraft currently operated by the commercial airline industry employ airborne data acquisition (ADA) equipment, such as a digital flight data acquisition unit (DFDAU) as a non-limiting example, which monitor signals supplied from a variety of transducers distributed throughout the aircraft, and provide digital data representative of the aircraft's flight performance based upon such transducer inputs. As flight performance data is obtained by the acquisition equipment, it is stored in an attendant, physically robust, flight data recorder (commonly known as the aircraft's "black box"), so that in the unlikely event of an in-flight mishap, the flight data recorder can be removed and the stored flight performance data analyzed to determine the cause of the anomaly.

In a further effort to improve aircraft safety, rather than wait for an accident to happen before analyzing flight recorder data, the Federal Aviation Administration (FAA) has issued a draft advisory circular AC-120-XX, dated Sep. 20, 1995, entitled "Flight Operational Quality Assurance Program" (FOQA), which recommends that the airlines look at the information provided by the digital flight data acquisition unit at regular intervals.

One suggested response to this recommendation is to equip each aircraft with a redundant flight data recording unit having a removable data storage medium, such as a floppy disc. Such an auxiliary digital data recorder is intended to allow aircraft safety personnel to gain access to the flight performance data by physically removing the auxiliary unit's data disc, the contents of which can then be input to an aircraft performance analysis data processing system for evaluation.

Although installing such a redundant flight data recording unit allows airline personnel to retrieve a copy of the flight performance data for subsequent evaluation, when considering the large volume of aircraft traffic experienced by major commercial airports, the above-proposed scheme is not only extremely time and manpower intensive, but is prone to substantial misidentification and aircraft/data association errors.

Other proposals, described in U.S. Pat. No. 5,359,446, are to use either a direct line-of-sight infrared link or a fiber optic cable to couple an on-board aircraft computer system with a ground-based computer system. Obvious drawbacks to these systems are the fact that not only do they employ complex and expensive components, but require that the aircraft be parked at the gate, so that the line-of-sight infrared transceivers or the fiber optic connection assemblies can be properly interlinked. As a consequence, neither of these types of systems is effective for use with commuter, cargo or military aircraft, which are customarily parked on an apron, rather than at a mating jetway, where such an optical link is to be provided.

SUMMARY OF THE INVENTION

In accordance with the present invention, the above-described objective of periodically analyzing flight performance data, without having to physically access a redundant unit on board the aircraft, is successfully addressed by means of a wireless ground data link, through which flight performance data provided by airborne data acquisition equipment is stored, compressed, encrypted and downloaded to an airport-resident ground subsystem, which forwards flight performance data files from various aircraft to a flight operations control center for analysis. For purposes of providing a non-limiting example, in the description of the present invention, the data acquisition equipment will be understood to be a DFDAU.

For this purpose, an auxiliary data path is coupled from the DFDAU in parallel with the flight data recorder to a bidirectional radio frequency (RF) carrier-based ground data link (GDL) unit, that is installed in the avionics compartment of the aircraft. The GDL unit is operative to communicate with an airport-resident ground subsystem via the RF communications ground link infrastructure.

In accordance with a preferred embodiment of the invention, this wireless ground data link is implemented as a spread spectrum RF link, preferably having a carrier frequency lying in a reasonably wide (on the order of 100 MHz) unlicensed 2.4–2.5 GHz S-band segment, which provides the advantage of global acceptance. A benefit of spread spectrum modulation is its inherently low energy density waveform properties, which are the basis for its acceptance for unlicensed product certification. Spread spectrum also provides the additional benefits of resistance to jamming and immunity to multipath interference.

A principal function of the GDL unit is to store a compressed copy of the (ARINC 717) flight performance data generated by the DFDAU and supplied to the aircraft's flight data recorder. The GDL unit is also configured to store and distribute auxiliary information uploaded to the aircraft from a wireless router (as directed by the remote operations control center) in preparation for its next flight. The uploaded information may include audio, video and data, such as flight navigation information, and digitized video and audio files that may be employed as part of an in-flight passenger service/entertainment package. The GDL unit may also be coupled to an auxiliary printer that is ported to the GDL unit in order to enable an immediate hard copy of flight data information (e.g. exceedences of parameter data) to be provided to the crew immediately upon the conclusion of the flight.

Once an aircraft has landed and is within communication range of the ground subsystem, the wireless router receives flight performance data via the wireless ground data link from an aircraft's GDL unit. It also supplies information to the aircraft in preparation for its next flight. The wireless router receives flight files from the aircraft's GDL unit and forwards the files to an airport base station, which resides on the airports local area network (LAN).

The airport base station forwards flight performance data files from various aircraft by way of a separate communications path such as a telephone company (telco) land line to a remote flight operations control center for analysis. The airport base station automatically forwards flight summary reports, and forwards raw flight data files, when requested by a GDL workstation.

The flight operations control center, which supports a variety of airline operations including flight operations, flight safety, engineering and maintenance and passenger services, includes a system controller segment and a plurality of FOQA workstations through which flight performance system analysts evaluate the aircraft data files that have been conveyed to the control center.

Depending upon its size and geographical topography, an airport may include one or more wireless routers, that are installed within terminal buildings serving associated pluralities of gates, to ensure complete gate coverage. Redundant base stations may be utilized to assure high system availability in the event of a hardware failure. A large commercial airport exhibits the communication environment of a small city; consequently, it can be expected that radio communications between a respective wireless router and associated aircraft at gates will be subjected to multipath interference. In order to prevent the disruption of wireless router-GDL communications as a result of such a multipath environment, the wireless ground data link between each aircraft and a wireless router is equipped to execute either or both of a frequency management and an antenna diversity scheme.

Antenna diversity, which may involve one or more diversity mechanisms, such as spatial or polarization diversity, ensures that an aircraft that happens to be in a multi-path null of one antenna can still be in communication with another antenna, thereby providing full system coverage regardless of blockage. Frequency management is accomplished by subdividing a prescribed portion of the unlicensed radio frequency spectrum used by the system for GDL—wireless router communications into adjacent sub-band channels, and dynamically assigning such sub-band channels based upon the quality of the available channel links between a respective wireless router and a given aircraft. Such sub-channel assignments may involve downloading compressed and encrypted aircraft flight data over a first channel portion of the usable spectrum to the wireless router, and uploading information from a base station to the aircraft (e.g. video, audio and flight control data) from a wireless router over a second channel portion of the useable spectrum to the GDL on board the aircraft.

In a preferred embodiment, a respective wireless router employs a source coding system that achieves bandwidth reduction necessary to permit either multiple audio channels to be multiplexed onto the wireless transmit carrier to the GDL unit, video to be transmitted over a ground subsystem's wireless router-to-GDL unit ground link frequency channel, or data files to be compressed to maximize system throughput and capacity during communications (uploads to or downloads from) the aircraft.

Cyclic Redundancy Check (CRC) coding is used for error detection only. When errors are detected at the wireless router, its transceiver requests a retransmission from the GDL unit, in order to guarantee that the copy of the flight performance data file downloaded from the GDL unit and forwarded from a wireless router is effectively error free.

In the uplink direction from the ground subsystem to the aircraft, the bit error rate requirements for transmitting passenger entertainment audio and video files are less stringent, and a forward error correction (FEC) and error concealment mechanism is sufficient to achieve a playback quality acceptable to the human audio/visual system. Also since uploading an in-flight passenger audio/video file, such as a news service or entertainment program, may entail several tens of minutes (customarily carried out early in the morning prior to the beginning of airport flight operations), there is usually no additional time for its retransmission.

The wireless router transceiver includes a control processor which ensures robust system performance in the dynamically changing unlicensed spread spectrum interference environment of the ground data link by making decisions based on link signal quality, for the purpose of setting transmit power level, channel frequency assignment, and antenna selection. The ground subsystem processor also initiates a retransmission request to an aircraft's GDL unit upon detection of a bit error in a downlinked flight performance data packet.

Before requesting retransmission of a flight data packet, the wireless router's transceiver measures the signal quality on the downlink channel portion of the ground data link. The transceiver in the wireless router assesses the measured link quality, increases its transmit power level as necessary, and requests a retransmission of the packet containing the bit error at a higher transmit power level. It then initiates a prescribed frequency management protocol, to determine if another channel portion of the GDL link would be a better choice. If a higher quality channel is available, both transceivers switch over to the new frequency. The flight performance data packet containing the bit error is retransmitted until it is received error free at the wireless router.

Because the invention operates in an unlicensed portion of the electromagnetic spectrum, it can be expected to encounter other unlicensed communication products, such as employed by curbside baggage handling and ticketing, rental car and hotel services, etc., thereby making the communication environment unpredictable and dynamically changing. To solve this problem, the present invention employs a frequency management scheme, which initially determines the optimum operating frequency and automatically changes to a better quality frequency channel when the currently established channel suffers an impairment.

The spread spectrum transceiver in each of an aircraft's GDL unit and an associated airport wireless router includes a frequency agile spread spectrum transmitter, a frequency agile spread spectrum receiver and a frequency synthesizer. In addition to being coupled to an associated control processor, the spread spectrum transmitter is coupled to an adaptive power control unit and an antenna diversity unit. Such a power allocation mechanism makes more efficient use of available power sources, reduces interference, and makes more efficient use of the allocated frequency spectrum. The control processors at each end of the wireless ground link execute a communication start-up protocol, through which they sequentially evaluate all of the available frequency channels in the unlicensed 2.4–2.5 GHz S-band segment of interest and assess the link quality of each of these channels.

Each wireless router transceiver sequentially and repeatedly sends out a probe message directed to any of the GDL units that are within the communication range of gates served by that wireless router, on each of all possible frequency channels into which the 2.4–2.5 GHz S-band spread spectrum bandwidth has been divided. Each GDL unit within communication range of the wireless router returns a response message on each frequency channel, and indicates which frequency is preferred, based upon the signal quality assessment and measured signal quality by its communication processor. The wireless router control processor evaluates the responses from each of the GDL units, selects the frequency of choice, and then notifies the GDL units within communication range of its decision. This process is periodically repeated and is executed automatically in the event of a retransmission request from a GDL unit.

As described earlier, in an environment such as a large commercial airport, a common cause of reduced signal quality is multipath interference resulting from sudden attenuation in the direct path between the transmitters and the receivers in the wireless router and aircraft, in conjunction with a delayed signal arriving at the receiver from a reflected path. This sudden attenuation in the direct path between the aircraft and the wireless router can result in the destructive summation of multiple paths at the antenna in use, resulting in a severe signal fading condition. The nature of multipath is such that switching to a second spatially separated or orthogonally polarized antenna can result in a significant improvement in link performance. Since the wireless networking environment of an airport is one in which objects are likely to be moving between the wireless router and the aircraft, and one of the platforms (the aircraft) is mobile, antenna diversity can make the difference between reliable and unreliable system performance.

Pursuant to the invention, upon the occurrence of a prescribed reduction in link quality, an antenna diversity mechanism is employed. Such a mechanism may involve the use of separate transceivers (each having a respective antenna), or an antenna diversity unit that switches between a pair of spatially separated or orthogonally polarized antennas. Link performance is evaluated for each antenna in real time, on a packet-by-packet basis, to determine which antenna provides the best receive signal quality at the wireless router.

Signal quality is continually measured at the receiver demodulator output and reported to the control processor. Should there be a sudden degradation in link signal quality, the wireless router control processor switches over to the other antenna. If the degradation in signal quality cannot be corrected by invoking the antenna diversity mechanism, such as by switching antennas, the wireless router has the option of increasing the transmit power level at both ends of the link to compensate for the reduction in link quality and/or execute the frequency management routine to search for a better operating channel. In the wireless router's broadcast mode, the same signal can be transmitted from both antennas in order to assure reliable reception at all aircraft, regardless of changing multipath conditions.

BRIEF DESCRIPTION OF THE DRAWINGS

FIG. 1B diagrammatically illustrates a modification of FIG. 1A showing various subsystem portions of the system architecture of FIG. 1 installed within the terminal topography of Atlanta's Hartsfield International Airport;

FIG. 1C lists identifications of the subsystem components of FIGS. 1, 1A and 1B;

DETAILED DESCRIPTION

Figure 1:
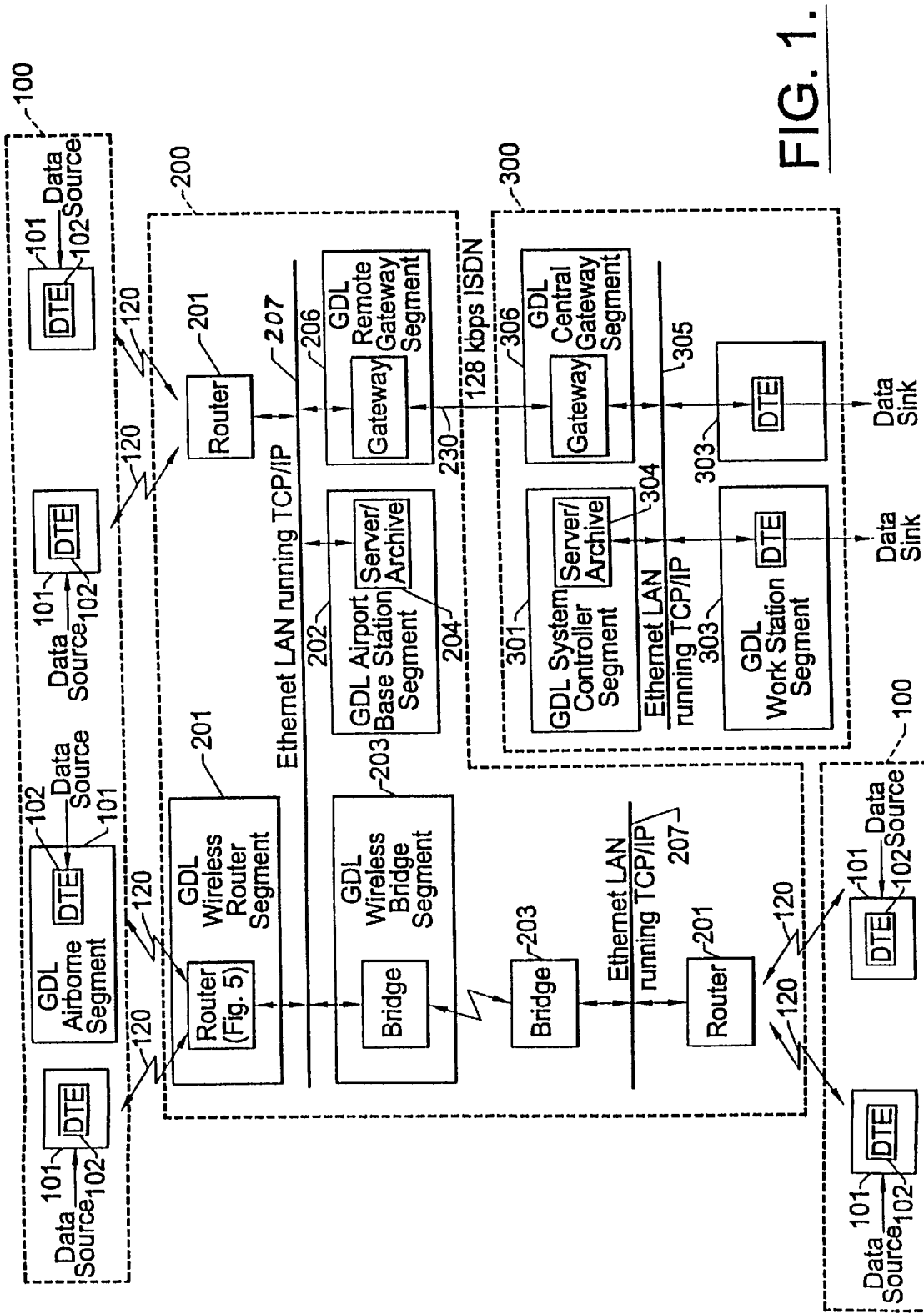
FIG. 1 diagrammatically illustrates the overall system architecture of the wireless ground link-based aircraft data communication system according to the present invention.

Before describing in detail the wireless ground link-based aircraft data communication system in accordance with the present invention, it should be observed that the present invention resides primarily in what is effectively a prescribed arrangement of conventional avionics and communication circuits and associated digital signal processing components and attendant supervisory control circuitry therefor, that controls the operations of such circuits and components. Consequently, the configuration of such circuits and components and the manner in which they are interfaced with other communication system equipment have, for the most part, been illustrated in the drawings by readily understandable block diagrams, which show only those specific details that are pertinent to the present invention, so as not to obscure the disclosure with details which will be readily apparent to those skilled in the art having the benefit of the description herein. Thus, the block diagram illustrations are primarily intended to show the major components of the system in a convenient functional grouping, whereby the present invention may be more readily understood.

Figure 1A:
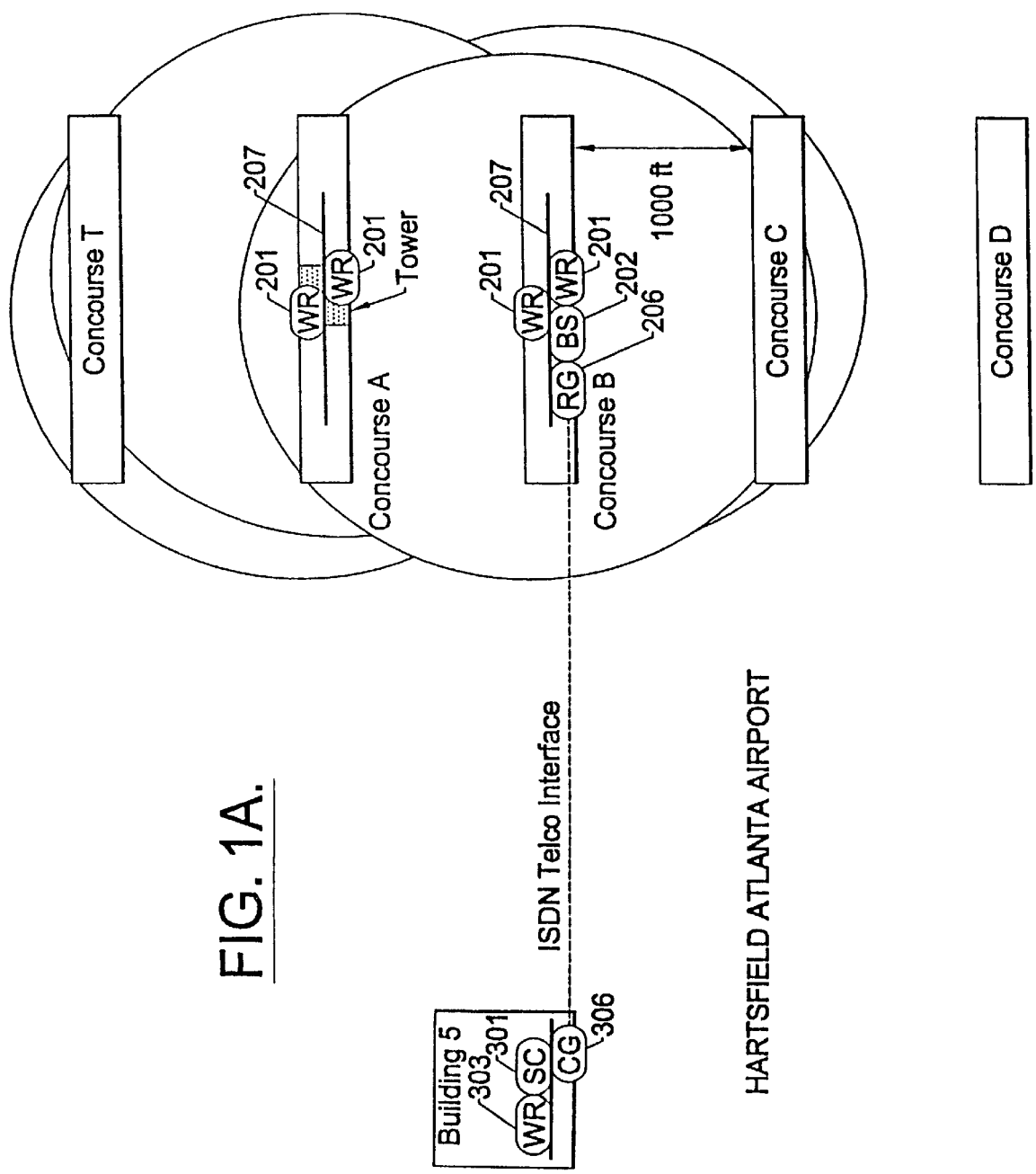
FIG. 1A diagrammatically illustrates a non-limiting example of where, within the terminal topography of Atlanta's Hartsfield International Airport, various subsystem portions of the system architecture of FIG. 1 may be installed.

Referring now to FIG. 1, the overall system architecture of the wireless ground link-based aircraft data communication system according to the present invention is shown as being comprised of three interlinked subsystems: 1)—an aircraft-installed ground data link (GDL) subsystem 100; 2)—an airport-resident ground subsystem 200; and 3)—a remote flight operations control center 300. Associated with FIG. 1 are FIGS. 1A and 1B, which diagrammatically illustrate non-limiting examples of where, within the terminal topography of Atlanta's Hartsfield International Airport, various subsystem portions of the system architecture of FIG. 1 may be installed. FIG. 1A shows overlapping antenna coverage from multiple sites, while FIG. 1B shows full antenna coverage from a single tower. The subsystem portions are identified by the abbreviations listed in FIG. 1C, and referenced below.

The aircraft-installed ground data link (GDL) subsystem 100 is comprised of a plurality of GDL airborne segments 101, each of which is installed in the controlled environment of the avionics compartment of a respectively different aircraft. Each GDL airborne segment 101 is operative to communicate with a wireless router (WR) segment 201 of the airport-resident ground subsystem 200 through a wireless communications link 120.

The wireless router segment 201 routes the files it receives from the GDL airborne segment 101, either directly to the airport base station 202 via the wired Ethernet LAN 207, or indirectly through local area networks 207 and airport-resident wireless bridge segments 203. In accordance with a preferred embodiment of the invention, the wireless communication link 120 is a spread spectrum radio frequency (RF) link having a carrier frequency lying in an unlicensed portion of the electromagnetic spectrum, such as within the 2.4–2.5 GHz S-band.

As will be described, once installed in an aircraft, the data terminal equipment (DTE) 102 of a GDL segment 101 collects and stores flight performance data generated on board the aircraft during flight. It also stores and distributes information uploaded to the aircraft via a ground subsystem's wireless router 201 (shown in detail in FIG. 5, to be described) which is coupled thereto by way of a local area network 207 from a base station segment 202 of a ground subsystem 200 in preparation for the next flight or series of flights.

The uploaded information, which may include any of audio, video and data, typically contains next flight information data, such as a set of parameter-exceedance limits, and next flight navigation information, including, but not limited to, a navigation database associated with the flight plan of the aircraft, as well as digitized video and audio files that may be employed as part of a passenger service/entertainment package.

The ground subsystem 200 includes a plurality of airport-resident GDL wireless router segments 201, one or more of which are distributed within the environments of the various airports served by the system. A respective airport wireless router 201 is operative to receive and forward flight performance data that is wirelessly downlinked from an aircraft's GDL unit 101 and to supply information to the aircraft in preparation for its next flight, once the aircraft has landed and is in communication with the wireless router. Each ground subsystem wireless router 201 forwards flight files from the aircraft's GDL unit and forwards the files to a server/archive computer terminal 204 of the aircraft base station 202, which resides on the local area network 207 of the ground subsystem 200.

The airport base station 202 is coupled via a local communications path 207, to which a remote gateway (RG) segment 206 is interfaced over a communications path 230, to a central gateway (CG) segment 306 of a remote flight operations control center 300, where aircraft data files from various aircraft are analyzed. As a non-limiting example communications path 230 may comprise an ISDN telephone company (telco) land line, and the gateway segments may comprise standard LAN interfaces. However, it should be observed that other communication media, such as a satellite links, for example, may be employed for ground subsystem-to-control center communications without departing from the scope of the invention.

The flight operations control center 300 includes a system controller (SC) segment 301 and a plurality of GDL workstations (WS) 303, which are interlinked to the systems controller 301 via a local area network 305, so as to allow flight performance systems analysts at control center 300 to evaluate the aircraft data files conveyed to the flight operations control center 300 from the airport base station segments 202 of the ground subsystem 200.

The respective GDL workstations 303 may be allocated for different purposes, such as aircraft types (wide body, narrow body and commuter aircraft, for example). As described briefly above, the server/archive terminal 204 in the base station segment 202 is operative to automatically forward flight summary reports downloaded from an aircraft to the flight control center 300; it also forwards raw flight data files when requested by a GDL workstation 303.

The system controller 301 has a server/archive terminal unit 304 that preferably includes database management software for providing for efficient transfer and analysis of data files, as it retrieves downloaded files from a ground subsystem. As a non-limiting example, such database management software may delete existing files from a base station segment's memory once the files have been retrieved.

In addition, at a respective ground subsystem 200, for a given aircraft, a batch file may be written into each directory relating to that aircraft's tail number, type and/or airline fleet, so that a GDL unit on board the aircraft will be automatically commanded what to do, once a ground data link has been established with a ground subsystem's wireless router. The systems analyst at a respective GDL workstation 303 in the flight operations control center may initially request only a copy of the exceedance list portion of the flight parameter summary report. Should the report list one or more parameter exceedances, the system analyst may access the entire flight performance file relating to such parameter exceedances.

Figure 2:
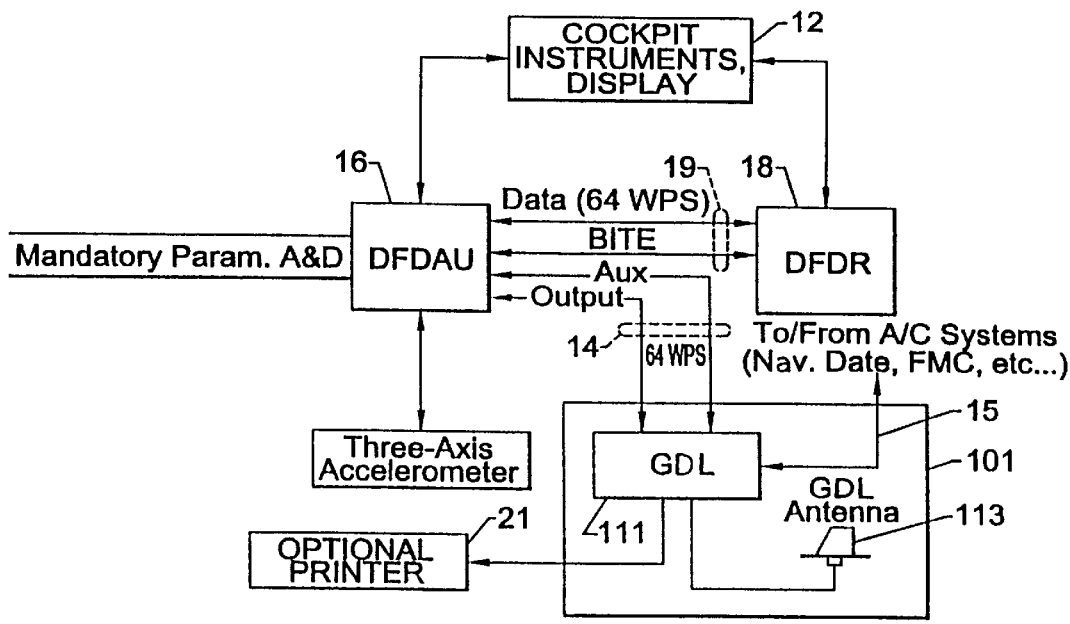
FIG. 2 diagrammatically illustrates a respective aircraft GDL segment of the system of FIG. 1.

Referring now to FIG. 2, a respective GDL segment 101 is diagrammatically illustrated as comprising a GDL data storage and communications unit 111 (hereinafter referred to simply as a GDL unit, to be described with reference to FIG. 3) and an associated external airframe (e.g. fuselage)-mounted antenna unit 113. In an alternative embodiment, antenna unit 113 may house diversely configured components, such as spaced apart antenna dipole elements, or multiple, differentially (orthogonally) polarized antenna components.

The GDL unit 111 is preferably installed within the controlled environment of an aircraft's avionics compartment, to which communication links from various aircraft flight parameter transducers, and cockpit instruments and display components, shown within broken lines 12, are coupled. When so installed, the GDL unit 111 is linked via an auxiliary data path 14 to the aircraft's airborne data acquisition equipment 16 (e.g. a DFDAU, in the present example). The GDL unit 111 synchronizes with the flight parameter data stream from the DFDAU 16, and stores the collected data in memory. It is also coupled via a data path 15 to supply to one or more additional aircraft units, such as navigational equipment and/or passenger entertainment stations, various data, audio and video files that have been uploaded from an airport ground subsystem wireless router 201.

The airborne data acquisition unit 16 is coupled to the aircraft's digital flight data recorder (DFDR) 18 by way of a standard flight data link 19 through which collected flight data is coupled to the flight data recorder in a conventional manner. In order to enable an immediate hard copy of prescribed flight data information (e.g. exceedances of parameter data) to be printed out for review by the flight crew immediately upon the conclusion of a flight, the cockpit-resident equipment may include an auxiliary printer 21 that is ported to GDL unit 111.

Figure 3:
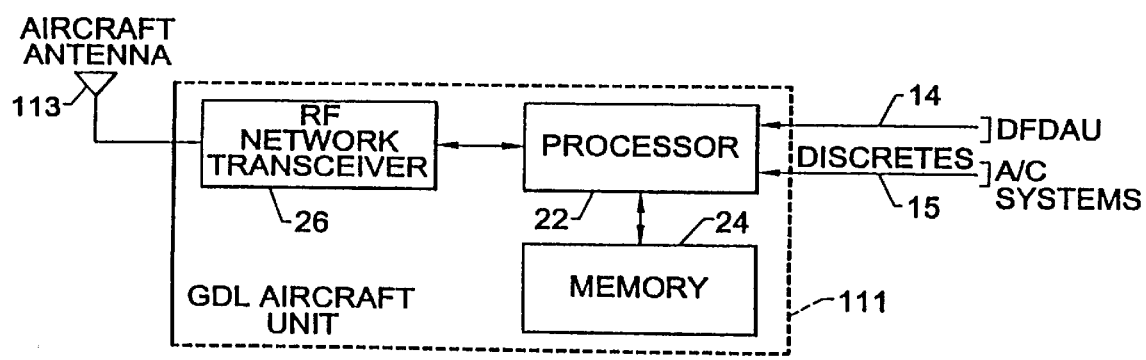
FIG. 3 diagrammatically illustrates a GDL data storage and communications unit of a respective GDL segment of FIG. 2.

As described briefly above, and as diagrammatically illustrated in FIG. 3, GDL unit 111 is a bidirectional wireless (radio frequency carrier-based) subsystem containing a processing unit 22 and associated memory 24 coupled to the DFDAU 16, via data path 14, which is parallel to or redundant with the data path to the flight data recorder 18. Processing unit 22 receives and compresses the same flight performance data that is collected by the aircraft's digital flight data recorder, and stores the compressed data in associated memory 24. The compressed data file includes a flight summary report generated by the processing unit 22, that includes a list of exceedences as defined by the parameter exceedence file.

To provide bidirectional RF communication capability with a wireless router 201, GDL unit 111 includes a wireless (RF) transceiver 26, which is coupled to the antenna unit 113. Preferably, memory 24 of the GDL unit 111 has sufficient archival storage capacity to retain accumulated flight data files until the next landing, so that there is no loss of flight data due to airport terminal multipath or single point hardware failures, a requirement that all airports be equipped with a GDL system.

As will be described, on each of a plurality of sub-band channels of the unlicensed 2.4–2.5 GHz S-band segment of interest, a wireless router 201 continuously broadcasts an interrogation beacon that contains information representative of the emitted power level restrictions of the airport. Using an adaptive power unit within its transceiver, the GDL unit 111 on board the aircraft responds to this beacon signal by adjusting its emitted power to a level that will not exceed communication limitations imposed by the jurisdiction governing the airport. The wireless (RF) transceiver 26 then accesses the compressed flight performance data file stored in memory 24, encrypts the data and transmits the file via a selected sub-channel of the wireless ground communication link 120 to wireless router 201. The sub-channel selected is based upon a signal quality monitoring mechanism, as will be described. The recipient wireless router 201 forwards the data file to the base station segment for storage; further, the flight summary file is automatically transmitted over the communications path 230 to the remote flight operations control center 300 for analysis.

As noted above, each airport-resident subsystem 200 of the present invention comprises one or a plurality of ground subsystem wireless routers 201. The number of wireless routers 201 installed at any given airport and the location of each ground subsystem within the geographical confines of the airport is preferably tailored in accordance with a number of factors, such as the topography of the airport, including the location of a tower relative to a terminal's gates, and a desired location of wireless router that facilitates access to communication path 230 to the remote flight operations control center 300.

Figure 4:
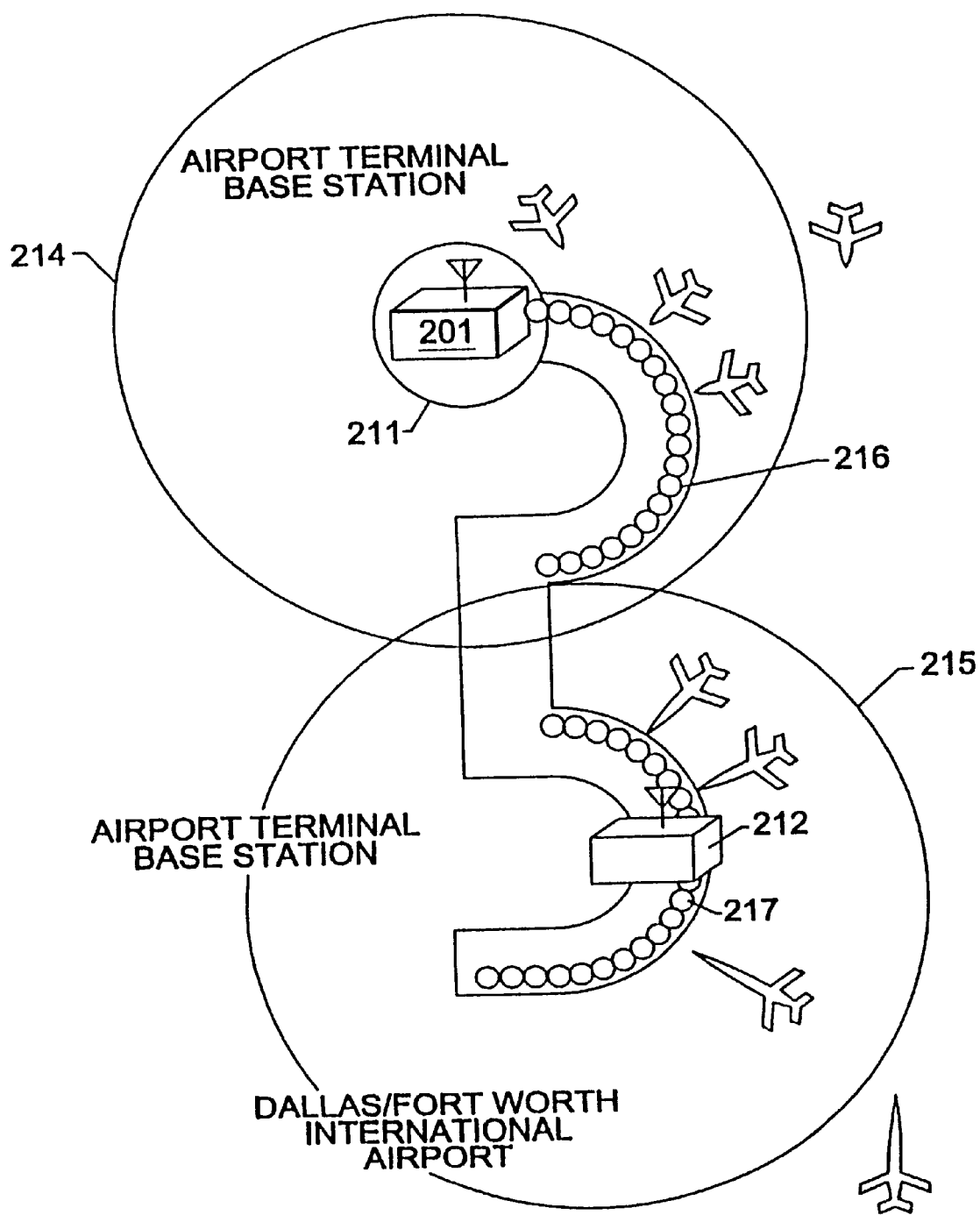
FIG. 4 diagrammatically illustrates the gate/terminal topography of the Dallas/Fort Worth International Airport.

Typically, but not necessarily, a wireless router 201 may be physically installed at a (roof) location of an airport terminal building serving a plurality of gates, such as a location 211 in the familiar 'multi-horseshoe' topography of the Dallas/Fort Worth International Airport, diagrammatically illustrated in FIG. 4, as a non-limiting example. Where an airport contains multiple terminals or has a large number of gates distributed over a substantial airport area (as does the Dallas/Fort Worth International Airport), the airport may be equipped with one or more additional wireless router locations, shown at 212 in FIG. 4, in order to ensure complete gate coverage.

The locations of wireless router locations 211 and 212 are such that, regardless of its location, each aircraft will be assured of having a wireless ground data link with a wireless router of the ground subsystem. In the exemplary environment of the Dallas/Fort Worth International Airport of FIG. 4, the spacing between wireless router locations 211 and 212 is such as to provide overlapping ground link communication coverage, as indicated by overlapping circles 214 and 215, whose respective radii encompass the entirety of their associated multi-gate areas 216 and 217. (Similar overlapping circle coverage is diagrammatically shown in FIG. 1A for wireless routers located at concourses A and B of the Atlanta airport, as another non-limiting example.)

Because a large airport, such as each of the Atlanta and Dallas/Fort Worth International Airports, has multiple terminal and maintenance buildings, and a sizeable number of ground service vehicles and personnel, serving multiple, various sized aircraft, from private, single engine aircraft to jumbo jets, the airport effectively exhibits the communication environment of a small city. As a result, it can be expected that radio communications between a respective wireless router and its associated gates will be subjected to multipath interference.

In order prevent the disruption of wireless router-GDL unit communications in such a multipath environment, the wireless communication links that are established between the aircraft and the ground subsystem wireless routers preferably employ a frequency management and a diversity antenna scheme that optimizes the choice of frequency channel within the available unlicensed 2.4–2.5 GHz S-band employed in accordance with the invention.

As noted earlier, antenna diversity may involve the use of separate transceivers (each having a respective antenna), or an antenna diversity unit that switches between a pair of spatially separated or orthogonally polarized antennas, as non-limiting examples, so as to ensure that an aircraft that happens to be located in a multi-path null of one antenna can still be in communication with another antenna, thereby providing full system coverage regardless of blockage or multi-path nulls.

Figure 5:
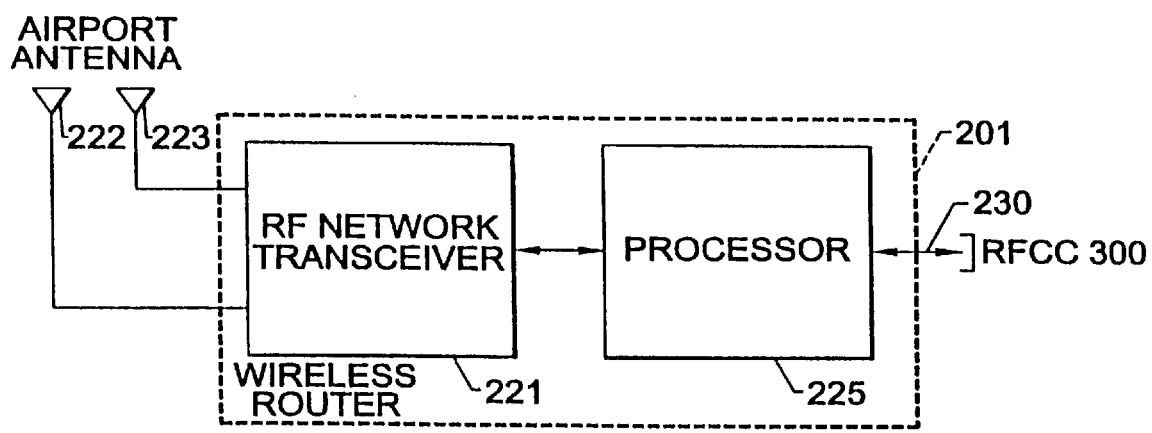
FIG. 5 diagrammatically illustrates a wireless router.

For this purpose, as diagrammatically shown in FIG. 5, a respective wireless router 201 may include an RF transceiver 221 having a pair of associated first and second antennas 222 and 223, which may be mounted on the roof of a terminal building, as noted above, so as to be physically spaced apart from one another (either vertically, horizontally, or both) by a prescribed separation distance that is sufficient to provide antenna spatial diversity. As a non-limiting example, for an RF carrier frequency in the unlicensed 2.4–2.5 GHz S-band, spacing antennas 222 and 223 apart from one another by a distance on the order of ten feet has been found to satisfactorily obviate multipath interference. As will be described in greater detail below with reference to FIG. 6, transceiver 221 has an associated communications processor 225 which is coupled via communications path 230 to the remote flight control center 300.

The redundant coverage provided by the diversity antenna mechanism ensures that should an aircraft be located in a multi-path null of one antenna, that particular aircraft can still be seen by the other antenna, thereby providing full wireless router coverage regardless of blockage. In addition, where an additional wireless router is provided, system reliability can be enhanced to provide a high probability of successful communications, should a single point hardware failure occur. This added redundancy prevents a single wireless router failure from severing the GDL airport system coverage, and delaying access to flight files. As pointed out above, in the unlikely event of a system failure at one GDL-equipped airport, the memory 24 of a respective GDL unit 111 has sufficient archival storage capacity to retain accumulated flight data files until the next landing, so that there is no loss of flight data due to airport terminal multipath or single point hardware failures.

The frequency management scheme employed by each of the wireless router and GDL unit transceivers involves subdividing the unlicensed radio frequency S-band spectral segment (2.4–2.5 GHz) used by the system for inter GDL-wireless router communications into adjacent sub-band channels, and dynamically assigning such sub-band channels, based upon the quality of the available channel links between a respective wireless router and a given aircraft. Such sub-channel assignments may involve downloading compressed and encrypted aircraft flight data over a first channel portion of the usable spectrum to the wireless router, and uploading information to the aircraft (e.g. video, audio and flight control data) from a wireless router 201 over a second channel portion of the useable spectrum to the GDL 111 on board the aircraft.

Pursuant to a preferred embodiment of the present invention, each wireless router 201 employs a source coding system that achieves bandwidth reduction necessary to permit either multiple audio channels to be multiplexed onto the wireless transmit carrier to an aircraft's GDL unit 111, video to be transmitted over the wireless router-GDL unit ground link frequency channel, or data files to be compressed in order to maximize system throughput and capacity during upload to the aircraft. The primary advantage of source coding is data compression, which permits any audio, video, or data to be uploaded to the aircraft to be compressed and multiplexed onto a single RF carrier. Employing source coding also eliminates the need for multiple, simultaneous carriers, which increases channel assignment options, and translates directly to improved link performance.

As pointed out earlier, the unlicensed frequency spectrum is becoming increasingly crowded, so that expanding the number of channel assignment options can mean the difference between being able to operate or not. Fewer transmitters also means lower power consumption, decreased complexity, and improved reliability. Adjacent channel interference concerns resulting from the close proximity of multiple frequency division multiplex transmitters is not an issue with a single carrier system. As a non-limiting example, Motion Picture Expert Group (MPEG) coding may be employed for audio and video signals, while other similarly conventional compression algorithms (such as PKZiP) may be used for generic data file compression.

In order to provide a reliable bidirectional RF communication link between the aircraft and the wireless router, namely one which is able to withstand the effects of channel impairments such as noise, jamming, or fading, the wireless ground data link communication mechanism of the present invention employs an error detection and retransmission error correction scheme to assure error free communications for downloading flight performance data from the aircraft to a ground subsystem wireless router. While exchanging flight-critical data files in the aircraft-to-wireless router direction, cyclical redundancy check (CRC) coding is used for error detection only. When errors in the downloaded flight data are detected at the wireless router 201, the wireless router's transceiver requests a retransmission from the aircraft GDL unit. This fulfills the critical requirement that the copy of the flight data file downloaded from the GDL unit and forwarded from the wireless router must be effectively error free.

In the uplink direction from the wireless router 201 to the aircraft, on the other hand, the bit error rate requirements for transmitting non flight-critical data, such as passenger entertainment audio and video files, are less stringent, and a forward error correction (FEC) mechanism is sufficient to achieve a playback quality on-board the aircraft, that is acceptable to the human audio/visual system. Where the data transmitted to the aircraft is flight critical, the error detection and retransmission scheme as described above for the downlink direction is employed.

Moreover, because uploading an in-flight passenger audio/video file, such as a news service or entertainment program, may entail several tens of minutes (customarily carried out early in the morning prior to the beginning of airport flight operations), there is usually no time for retransmission of such a large database. Typically, during this 'pre-ops' time interval, with no arriving flights being handled, the entire bandwidth availability may be used for broadcasting one or more video news and entertainment files to multiple aircraft at the same time (using industry standard broadband coding such as MPEG, referenced above).

Figure 6:
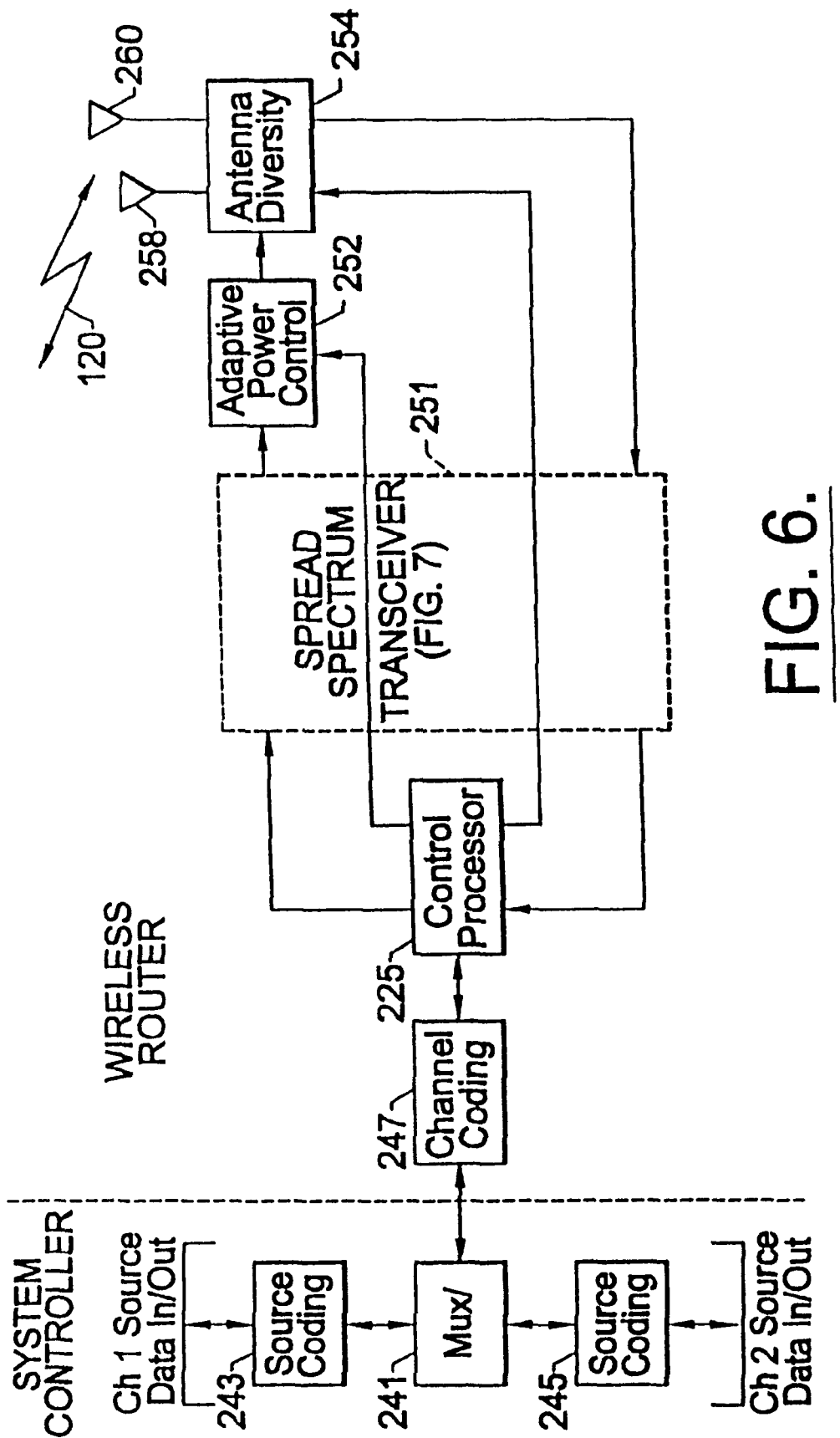
FIG. 6 diagrammatically illustrates the architecture of the wireless router of FIG. 5 in greater detail.

The manner in which the above described error detection and retransmission error correction scheme may be implemented in a respective wireless router is diagrammatically illustrated in FIG. 6, which details the architecture of wireless router transceiver components and associated interfaces to other system segment components. The system controller wireless router transceiver includes a multiplexer unit 241, containing system time synchronization circuitry and which is operative to selectively interface one of first and second source coding units 243 and 245 and a channel coding unit 247. The source coding units 243 and 245 are coupled to respective external data interfaces, while coding unit 247 is interfaced with a wireless router control processor 225, which serves as a baseband interface between channel coding unit 247 and a spread spectrum transceiver 251 (to be described in detail below with reference to FIG. 7).

As described briefly above, and as will be detailed below, wireless router control processor 225 is operative to ensure robust system performance in the unpredictable and dynamically changing unlicensed spread spectrum interference environment of the wireless ground data link 120, by making decisions based on link signal quality, for setting transmit power level, channel frequency assignment, and antenna selection. It also initiates a retransmission request to the GDL unit 111 in the event of a bit error in a received (downloaded) flight performance data packet.

Figure 8:
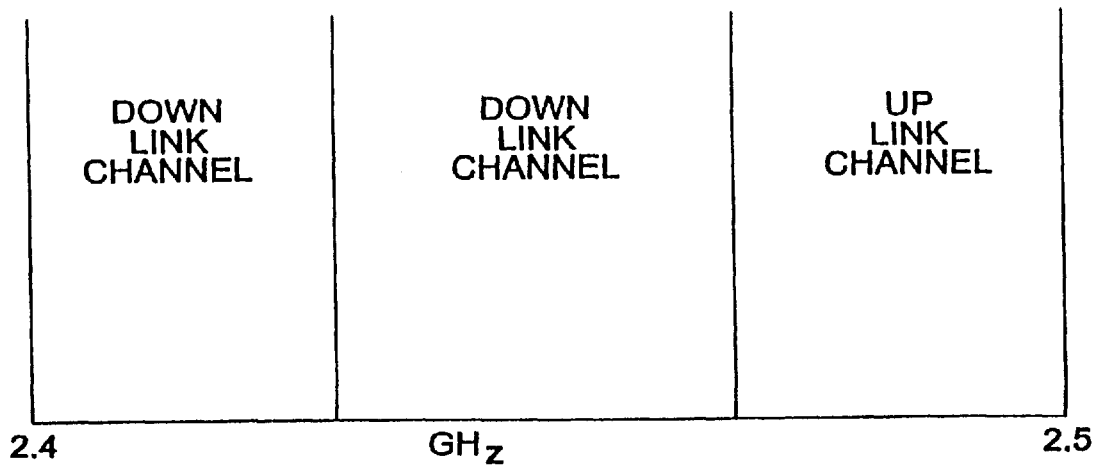
FIG. 8 diagrammatically illustrates a non-limiting example of a frequency channel subdivision of a spread spectrum transceiver of FIG. 7.

More particularly, when a cyclic redundancy check (CRC) error in the data stream received by the wireless router is detected by channel coding unit 247, control processor 225 initiates a retransmission request on the return channel portion of the wireless link 120 back to the transceiver 26 within the aircraft's GDL unit 111. Before requesting retransmission of a flight data packet, the control processor 225 measures the signal quality on the downlink channel portion of the link 120. The wireless router 201 assesses measured link quality, increases its transmit power level as necessary, and requests a retransmission of the flight performance data packet containing the bit error at a higher transmit power level. It then initiates a prescribed frequency management protocol, to be described below with reference to FIG. 8, in order to determine if another channel portion of the GDL link would be a better choice. If a better (higher quality) channel is available, both the GDL transceivers switch over to the new frequency channel (within the unlicensed 2.4–2.5GHz S-band of interest). The packet containing the bit error is retransmitted until it is detected by wireless router control processor 225 as being error-free.

As noted previously, since the wireless ground data link system of the present invention operates in an unlicensed portion of the EM frequency spectrum, it can be expected that it will encounter other unlicensed products, which are also permitted to roam without imposed geographic (sitelicensing) constraints. As a consequence, the operating environment is unpredictable and dynamically changing. The level of activity within this unlicensed portion of the EM frequency spectrum can be expected to increase as more and more airport-related services, such as curbside baggage handling and ticketing, rental car and hotel services, etc., use compact (hand-held or headset-configured) unlicensed wireless communication devices.

This mutual interference effect is similar to that encountered in the HF frequency band, where ionospheric radio links are subject to a number of transmission quality degradation characteristics, such as multipath, Doppler, fading and temporary loss of signal. The unpredictability of this environment originates from the relatively long wavelength of the carrier frequency and the fact that an HF radio wave bounces off the atmosphere, enabling it to propagate tremendous distances beyond the horizon. As a result, interference from transmitters that are geographically separated by great distances can pose problems. Since the ionosphere varies in height and ionization with time of day, season, and the solar cycle, the constantly changing interference characteristics of the HF environment are difficult to predict. It will be appreciated, therefore, that there are a number of similarities between operating in the HF band and operating in an unlicensed frequency band.

To solve this problem, the present invention employs a frequency management scheme, which initially determines the optimum operating frequency for the GDL link, and automatically changes to a better quality frequency channel when the currently established channel suffers an impairment. Such a frequency management scheme effectively corresponds to that employed in the D. McRae et al, U.S. Pat. No. 4,872,182, entitled, "Frequency Management System for Use in Multistation H. F. Communication Network," assigned to the assignee of the present application and the disclosure of which is incorporated herein.

Figure 7:
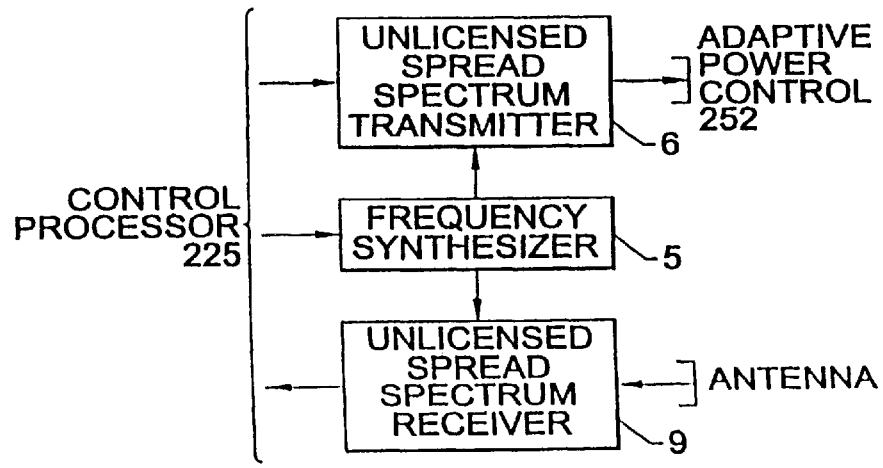
FIG. 7 details the components of a spread spectrum transceiver.

For this purpose, the spread spectrum transceiver of the present invention, which may be employed in the transceiver 251 of the wireless router of FIG. 6 and also in the transceiver 26 of an aircraft's GDL unit 111, is shown in more detail in FIG. 7 as comprising a frequency agile spread spectrum transmitter 253, a frequency agile spread spectrum receiver 255 and a frequency synthesizer 257. In addition to being coupled to an associated control processor, the spread spectrum transceiver 251 is coupled to RF components, including an adaptive power control unit 252 and an antenna diversity unit 254, as will be described. As a non-limiting example, such spread spectrum transceiver components may be implemented using a direct sequence spread spectrum wireless transceiver chipset and associated signal processing components, of the type as described the Harris Semiconductor information bulletins entitled: "PRISM (trademark Harris Corp.) 2.4 GHz Chip Set," April, 1995, "HFA3624 2.4 GHz RF to IF Converter," Feb. 14, 1995, "HFA3724 400 MHz Quadrature IF Modulator/Demodulator," February, 1995, "HSP3824 Direct Sequence Spread Spectrum Baseband Processor," March 1995, and "HFA3924 2.4 GHz Power Amplifier," Feb. 13, 1995.

The respective control processors at each end of the wireless ground data link (control processor 225 in the wireless router and the communications processing unit 22 in the GDL unit 111) employ a communication control mechanism that executes a start-up protocol, whereby all available frequency channels are examined to determine the link quality of each channel. For this purpose, the wireless router transceiver broadcasts out a probe message to each of the GDL units that are within communication range of gates served by that wireless router, in sequence, on each of all possible frequency channels into which the 2.4–2.5 GHz spread spectrum S-bandwidth has been divided, as shown diagrammatically in FIG. 8. These probe messages are, repeated a predetermined number of times.

Each sequentially interrogated GDL unit 111 then returns a response message on all the frequency channels, indicating which frequency is preferred, based upon the signal quality assessment and measured signal quality by its communication processor 22. The wireless router control processor 225 evaluates the responses from each of the GDL units 111, selects the frequency of choice, and then notifies each GDL unit 111 within communication range of its decision. This process is periodically repeated and is executed automatically in the event of a retransmission request from a GDL unit 111, as a result of a detected bit error, as described above.

As those skilled in the art are aware, a spread spectrum signal is one occupying a bandwidth much greater than the minimum bandwidth necessary to send information contained in the spread signal. Spreading of a transmitted signal across the bandwidth of interest is accomplished by use of a spreading code, or pseudo-random noise (PN) sequence, which is independent of the information being transmitted. At the receiver, despreading of the spread signal is accomplished by correlating the received signal with a matched replica of the spreading code used in the transmitter. Although implementation complexity and associated product cost have constituted practical impediments to the use of spread spectrum communications outside of niche military markets, recent advances in integrated circuit manufacturing techniques have now made it possible to provide reasonably priced spread spectrum communication circuits so that they may be employed in a variety of other applications.

In accordance with the present invention the spread spectrum transmitter and receiver components have two particularly useful characteristics. The first is their operation in the 2.4–2.5 GHz unlicensed S-band, which provides both the user and the manufacturer the advantages of global unlicensed operation. Other alternatives restrict usage geographically or require the user to obtain a license in order to operate the system. In the United States, FCC compliance is governed by Part 15.247.

The second is the use of direct sequence spread spectrum (DSSS), as opposed to the use of frequency hopped or narrowband communications. The inherent low energy density waveform properties of DSSS are the basis for its acceptance for unlicensed product certification. DSSS also provides the additional benefits of resistance to jamming and immunity to the multipath problem discussed above as a function of the amount of spreading employed. Moreover, the number of orthogonal signal dimensions of DSSS is larger than narrowband techniques, so that a sophisticated receiver is readily able to recognize and recover the intended signal from a host of potential interferers, thereby reducing their effect.

In the current wireless marketplace, where RF spectrum allocations have become a precious commodity, the prospects of unintentional jamming grow increasingly greater. Spread spectrum is a robust combatant to the growing threat of RF spectrum proliferation. Pursuant to the present invention, the DSSS transceivers employed in each of the GDL unit 111 on board the aircraft and in the airport's ground subsystem wireless router 201 are frequency agile, so that they can be tuned to any of a plurality of frequency channels approved for unlicensed operation in a given country. DSSS also provides the attractive performance benefits of immunity against jamming from interferers and immunity against self-jamming from multipath, as described earlier.

In order to provide orthogonal signal isolation from IEEE 802.11 users, it is preferred to employ a different PN code than the standard, but still complying with strict regulatory guidelines required for type licensing, such as FCC 15.247, referenced above. In addition, as diagrammatically illustrated in the frequency channel subdivision diagram of FIG. 8, the DSSS transceiver of FIG. 7 may employ different transmit frequencies and a different channel spacing to minimize co-channel interference. This mechanism is akin to that employed in cellular telephone networks which make use of a return channel from a cellular base station to allow a customer's handset to reduce its transmit power to the minimum level required to maintain reliable communications. Such a power allocation mechanism prolongs battery life, reduces interference, and makes more efficient use of the allocated frequency spectrum.

In the transceiver architecture of FIG. 6 employed in the GDL system of the present invention, the signal quality (e.g., bit error rate) is measured by wireless router control processor 225 to sense channel impairments. As described earlier, in an environment such as a large commercial airport, a common cause of reduced signal quality is multipath interference resulting from sudden attenuation in the direct path between the transmitter and the receivers in the wireless router and aircraft, in conjunction with a delayed signal arriving at the receiver from a reflected path. This sudden attenuation in the direct path between the aircraft and the wireless router can result in the destructive summation of reflected paths at the antenna in use, resulting in a severe signal fading condition. The nature of multipath is such that switching to a second spatially separated or orthogonally polarized antenna can result in a significant improvement in link performance. Since the wireless networking environment of an airport is one in which objects are likely to be moving between the wireless router and the aircraft, and one of the platforms is mobile, the use of an antenna diversity unit can make the difference between reliable and unreliable system performance.

In the event of a prescribed reduction in link quality, antenna diversity unit 254 is operative under processor control to switch between a pair of spatially separated or orthogonally polarized antennas 258 and 260. Link performance is evaluated for each antenna in real time, on a packet-by-packet basis, to determine which antenna provides the best receive signal quality at a ground subsystem's wireless router. Signal quality is continually measured at the receiver demodulator output and reported to the control processor. In the event of a sudden degradation in link signal quality, the wireless router control processor switches over to the other antenna. If the degradation in signal quality cannot be corrected by switching antennas, the wireless router has the option of increasing the transmit power level at both ends of the link to compensate for the reduction in link quality and/or initiate the frequency management protocol to search for a better operating channel. In the broadcast mode, the same signal can be transmitted from both antennas in order to assure reliable reception at all aircraft GDL units, regardless of changing multipath conditions.

If the transceiver is unable to produce a satisfactory improvement in link quality by switching antennas in the manner described above, then by way of the return channel, the control processor in the receiver notifies the transmitter of the condition and the measure of link quality. The transmitter then assesses the magnitude of the channel impairment as a result of examining the measured signal quality reported back from the receiver and instructs the adaptive power control unit 252 to increase its transmit power to compensate for the impairment, if appropriate. If the impairment is so severe that the transmitter cannot compensate for the impairment by increasing its transmit power level, it initiates frequency management protocol to find a clear channel.

In the transceiver architecture of FIG. 6, the spread spectrum receiver unit 251 (shown in detail in FIG. 7) reports assessed received link signal quality to the control processor 225. Signal quality measurements are carried simultaneously with symbol timing measurements and are declared when an acceptable signal is to be processed. The signal quality measured is a function of the average magnitude of the PN correlation peaks detected and of the time averaged phase error. The transceiver also performs a clear channel assessment, by monitoring the environment to determine when it is feasible to transmit. The wireless router receiver makes real time antenna diversity decisions to choose the best antenna to receive from on an aircraft by aircraft basis. Once a decision is made, the same antenna is used for wireless router transmissions back to the GDL unit in the aircraft, except in the broadcast mode, where both antennas 258 and 260 are used simultaneously.

As will be appreciated from the foregoing description, the objective of satisfying the FAA's current airline Flight Operations Quality Assurance program, which recommends that airlines routinely analyze aircraft data, is successfully addressed in accordance with the present invention by means of a frequency-agile wireless ground data link, that uses a reasonably wide unlicensed portion of the EM spectrum, does not require physically accessing the aircraft, and supplies the same aircraft data provided by the airborne data acquisition unit in a compressed and encrypted format, that is automatically downloaded to an ▶rport-resident base station segment, when tile aircraft lands. When polled by a remote flight operations control center, the base station segment then forwards aircraft data files from various aircraft over a communication path such as a telco land line to the flight operations control center for analysis.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein but intend to cover all such changes and modifications as are obvious to one of ordinary skill in the art.

What is claimed:

1. A system for providing a retrievable record of the flight performance of an aircraft comprising:
    a ground data link unit that obtains flight performance data representative of aircraft flight performance during flight of the aircraft, said ground data link unit comprising:
        a) an archival data store operative to accumulate and store flight performance data during flight of the aircraft, and
        b) a wideband spread spectrum transceiver coupled to said archival data store, and comprising a transmitter that is operative after the aircraft completes its flight and lands at an airport to download the flight performance data that has been accumulated and stored by said archival data store during flight over a wideband spread spectrum communication signal that comprises a signal in the range of about 2.4 to about 2.5 GHz;

an airport based wideband spread spectrum transceiver comprising a receiver that receives the wideband spread spectrum communication signal from the aircraft and demodulates the signal to obtain the flight performance data;

an airport based archival data store coupled to said airport based wideband spread spectrum transceiver that receives and stores the demodulated flight performance data;

an airport based processor coupled to said archival data store for retrieving flight data performance from the airport based archival data store;

a remote flight operations control center; and an airport based communications network operatively connecting said remote flight operations control center and airport based processor to allow the remote flight operations control center to receive and analyze the flight performance data.

2. A system according to claim 1, wherein said remote flight operations control center further comprises a system controller and plurality of ground data link workstations operatively connected to said system controller to allow flight performance analysts to evaluate aircraft flight performance data.

3. A system according to claim 1, wherein the wideband spread spectrum communication signal comprises a direct sequence spread spectrum signal.

4. A system according to claim 1, wherein the wideband spread spectrum communication signal comprises a signal within the S band.

5. A system according to claim 1, wherein said airport based wideband spread spectrum transceiver further comprises a wireless router that couples said wideband spread spectrum transceiver to said airport based archival data store.

6. A system according to claim 1, wherein said archival data store of said ground data link unit further comprises means for compressing said flight performance data during the flight of the aircraft.

7. A system according to claim 1, and further comprising a flight data recording system positioned on board the aircraft, wherein said archival data store of said ground data link unit is operatively coupled to said flight data recording system.

8. A system for providing a retrievable record of the flight performance of an aircraft comprising:

a ground data link unit that obtains flight performance data representative of aircraft flight performance during flight of the aircraft, said ground data link unit comprising:
  a) an archival data store operative to accumulate and store flight performance data during said flight of said aircraft, and
  b) a wideband spread spectrum transceiver coupled to said archival data store, and comprising a transmitter that is operative after the aircraft completes its flight and lands at an aircraft to download said flight performance data that has been accumulated and stored by said archival data store during flight over a wideband spread spectrum communication signal that comprises a signal in the range of about 2.4 to about 2.5 GHz;

a plurality of airport based wideband spread spectrum transceivers, each comprising a receiver that receives the wideband spread spectrum communications signal from the aircraft and demodulates the signal to obtain the flight performance data;

an airport based local area network connected to said plurality of airport based spread spectrum transceivers;

at least one airport base station operatively connected to said plurality of airport based wideband spread spectrum transceivers through said airport based local area network, said base station further comprising, an archival data store that receives and stores said flight performance data; and a processor coupled to said archival data store for retrieving flight data performance from the archival data store;

a remote flight operations control center; and an airport based communications network operatively connecting said remote flight operations control center and base station for requesting downloading of said flight performance data from said processor and archival data storage for transmission along said airport based communications network to said remote flight operations control center.

9. A system according to claim 8, wherein said airport based communications network connects said remote flight operations control center to other airport based base stations located at other airports to receive and analyze flight performance data from those airports.

10. A system according to claim 8, wherein said flight operations control center further comprises a system controller and plurality of ground data link workstations operatively connected to said system controller to allow flight performance analysts to evaluate aircraft flight performance data.

11. A system according to claim 8, wherein the wideband spread spectrum communication signal comprises a direct sequence spread spectrum signal.

12. A system according to claim 8, wherein the wideband spread spectrum communication signal comprises a signal within the S band.

13. A system according to claim 8, wherein said airport based wideband spread spectrum transceiver further comprises a wireless router that couples said wideband spread spectrum transceiver to said airport based base station.

14. A system according to claim 8, wherein said archival data store of said ground data link unit further comprises means for compressing said flight performance data during the flight of the aircraft.

15. A system according to claim 8, wherein said transceivers operate in half duplex mode.

16. A system for exchanging information to and from an aircraft comprising:

a ground data link unit that obtains flight performance data representative of aircraft flight performance during flight of the aircraft, said ground data link unit comprising:
  a) an archival data store operative to accumulate and store flight performance data during said flight of said aircraft, and
  b) a wideband spread spectrum transceiver coupled to said archival data store, and comprising a transmitter that is operative after the aircraft completes its flight and lands at an airport to download said flight performance data that has been accumulated and stored by said archival data store during said flight, over a first wideband spread spectrum communication signal that comprises a signal in the range of about 2.4 to about 2.5 GHz, and a receiver for receiving uploaded data over a second wideband spread spectrum communication signal that comprises a signal in the range of about 2.4 to about 2.5 GHz;

an airport based wideband spread spectrum transceiver comprising a receiver that receives the first wideband spread spectrum communication signal from the aircraft and demodulates the signal to obtain the flight performance data, and a transmitter that transmits data for uploading to the aircraft over a second wideband spread spectrum communication signal, said unloaded data including video, audio and flight information;

an airport based archival data store coupled to said airport based wideband spread spectrum transceiver that receives and stores said flight performance data and data to be uploaded to said aircraft;

an airport based processor coupled to said archival data store for retrieving flight performance data from the airport based archival data store; and a remote flight operations control center operatively coupled to said airport based processor to receive and analyze the flight performance data, said remote flight operations control center also storing video, audio and flight information for unloading.

17. A system according to claim 16, and further comprising a communications network interconnecting said airport based processor and said remote flight operations control center.

18. A system according to claim 17, wherein said communications network further comprises a local public switched telephone network.

19. A system according to claim 16, wherein said flight operations control center further comprises a system controller and plurality of ground data link workstations operatively connected to said system controller to allow flight performance analysts to evaluate aircraft flight performance data.

20. A system according to claim 16, wherein said video, audio and flight information to be uploaded to said aircraft further comprises digitized in-flight passenger service and entertainment video and audio files.

21. A system according to claim 16, wherein the wideband spread spectrum communication signal comprises a direct sequence spread spectrum signal.

22. A system according to claim 16, wherein the wideband spread spectrum communication signal comprises a signal within the S band.

23. A system according to claim 16, wherein said uploaded data comprises flight navigation information, and digitized in-flight passenger service and entertainment video and files.

24. A system according to claim 16, wherein said airport based wideband spread spectrum transceiver further comprises a wireless router that couples said wideband spread spectrum transceiver to said airport based archival data store.

25. A system according to claim 16, wherein said airchival data store of said ground data link unit further comprises means for compressing said flight performance data during the flight of the aircraft.

26. A system according to claim 16, wherein said transceivers operate in half duplex mode.

27. A method of providing a retrievable record of the flight performance of an aircraft comprising the steps of:

collecting data within a ground data link unit on the flight performance of the aircraft during flight of the aircraft;

accumulating and storing within an archival data store of the ground data link unit the flight performance data during flight of the aircraft;

after the aircraft lands at an airport at completion of the flight, downloading the flight performance data that has been accumulated and stored during the flight over a wideband spread spectrum communication signal that comprises a signal in the range of about 2.4 to about 2.5 GHz to an airport based spread spectrum receiver;

demodulating within the receiver the received spread spectrum signal to obtain the flight performance data;

storing the demodulated flight performance data within an airport based archival data store; and retrieving the flight performance data via an airport based processor; and routing the flight performance data from the airport based processor and archival data store via a first around based wideband spread spectrum transceiver via a first wideband spread spectrum communication signal to a ground based wideband spread spectrum transceiver functioning as a repeater to relay the flight performance data to a remote flight operations control center via a second wideband spread spectrum communication signal.

28. A method according to claim 27, and further comprising the step of evaluating the flight performance data at a plurality of ground data link workstations within the remote flight operations center.

29. A method according to claim 27, wherein the wideband spread spectrum communication signal comprises a direct sequence spread spectrum signal.

30. A method according to claim 27, wherein the wideband spread spectrum communication signal comprises a signal within the S band.

31. A method according to claim 27, wherein the wideband spread spectrum communication signal comprises a signal within the range of about 2.4 to about 2.5 Ghz.

32. A method according to claim 27, and further comprising the step of compressing the flight perfomance data within the archival memory storage during flight of the aircraft.

33. A method of exchanging data to and from an aircraft comprising the steps of:

collecting data within a ground data link unit on the flight performance of the aircraft during flight of the aircraft;

accumulating and storing within an archival data store of the ground data link unit the flight performance data during flight of the aircraft;

after the aircraft lands at an airport at completion of the flight, downloading the flight performance data that has been accumulated and stored during the flight over a first wideband spread spectrum communication signal that comprises a signal within the range of about 2.4 to about 2.5 GHz to an airport based spread spectrum transceiver;

demodulating the received spread spectrum signal within the airport based spread to obtain the flight performance data;

storing the demodulated flight performance data within an airport based archival data store;

retrieving data to be uploaded from a remote flight operations control center and forwarding the data to be uploaded to the airport based archival data storage;

retrieving the data to be uploaded from the airport based archival data storage; and transmitting the data from an airport based spread spectrum transceiver to the aircraft along a second wideband spread spectrum communication signal that comprises a signal within the range of about 2.4 to about 2.5 GHz to the ground data link unit within the aircraft.

34. A method according to claim 33, and further comprising the step of evaluating the flight performance data at a plurality of ground data link workstations within the remote flight operations center.

35. A method according to claim 33, wherein the wideband spread spectrum communication signal comprises a direct sequence spread spectrum signal.

36. A method according to claim 33, wherein the wideband spread spectrum communication signal comprises a signal within the S band.

37. A method according to claim 33, and further comprising the step of uploading to the aircraft from the airport based spread spectrum transceiver video, audio and flight information that has been stored within the airport based archival data store.

38. A method according to claim 37, wherein the video, audio and flight information to be uploaded further comprises digitized in-flight passenger service and entertainment video and audio files.

* * * * *

UNITED STATES PATENT AND TRADEMARK OFFICE
CERTIFICATE OF CORRECTION

PATENT NO. : 6,108,523
DATED : August 22, 2000
INVENTOR(S) : Wright et al.

It is certified that error appears in the above-indentified patent and that said Letters Patent is hereby corrected as shown below:

Column 16, line 37  Delete:
"▶rport-resident"

Substitute:
"airport-resident"

Column 20, line 17  Delete:
"around"

Substitute:
"ground"

Signed and Sealed this

Tenth Day of April, 2001

Attest:

NICHOLAS P. GODICI

Attesting Officer    Acting Director of the United States Patent and Trademark Office